United States Patent [19]

Peller

[11] 4,277,431
[45] Jul. 7, 1981

[54] METHOD OF DISPENSING METERED CHARGES OF MATERIAL

[75] Inventor: William N. Peller, Crawfordsville, Ind.

[73] Assignee: H-C Industries, Inc., Crawfordsville, Ind.

[21] Appl. No.: 41,097

[22] Filed: May 21, 1979

Related U.S. Application Data

[60] Continuation of Ser. No. 856,138, Nov. 30, 1977, abandoned, which is a division of Ser. No. 719,836, Sep. 2, 1976, Pat. No. 4,080,136.

[51] Int. Cl.³ .......................... B29B 5/06; B29C 17/14
[52] U.S. Cl. .......................................... 264/148; 264/5; 264/268; 264/309; 425/809
[58] Field of Search ............... 264/142, 143, 148, 157, 264/158, 268, DIG. 67, 5, 8, 309; 425/809

[56] References Cited

U.S. PATENT DOCUMENTS

| | | | |
|---|---|---|---|
| 3,777,609 | 12/1973 | Michel et al. | 425/302 B |
| 3,827,843 | 8/1974 | Blouch | 425/127 |
| 3,867,081 | 2/1975 | Everett | 425/311 |

Primary Examiner—James B. Lowe
Attorney, Agent, or Firm—Dressler, Goldsmith, Shore, Sutker & Milnamow

[57] ABSTRACT

A method is disclosed for providing a measured quantity of extrudate material to a receiving means. The extrudate material exits through an outlet, and a cutting surface is positioned adjacent to the outlet. The extrudate material is severed by a cutting means having a flexible and resilient blade for severing the extrudate material into metered charges. The cutting blade contacts the cutting surface during each revolution and bends from a rest condition to a backwardly bent flexed condition. After severing a metered charge, the cutting blade is released from the cutting surface and snaps forwardly to the rest condition to propel the metered charge toward the receiving means at a velocity greater than the average tangential velocity per revolution of the cutting blade.

3 Claims, 5 Drawing Figures

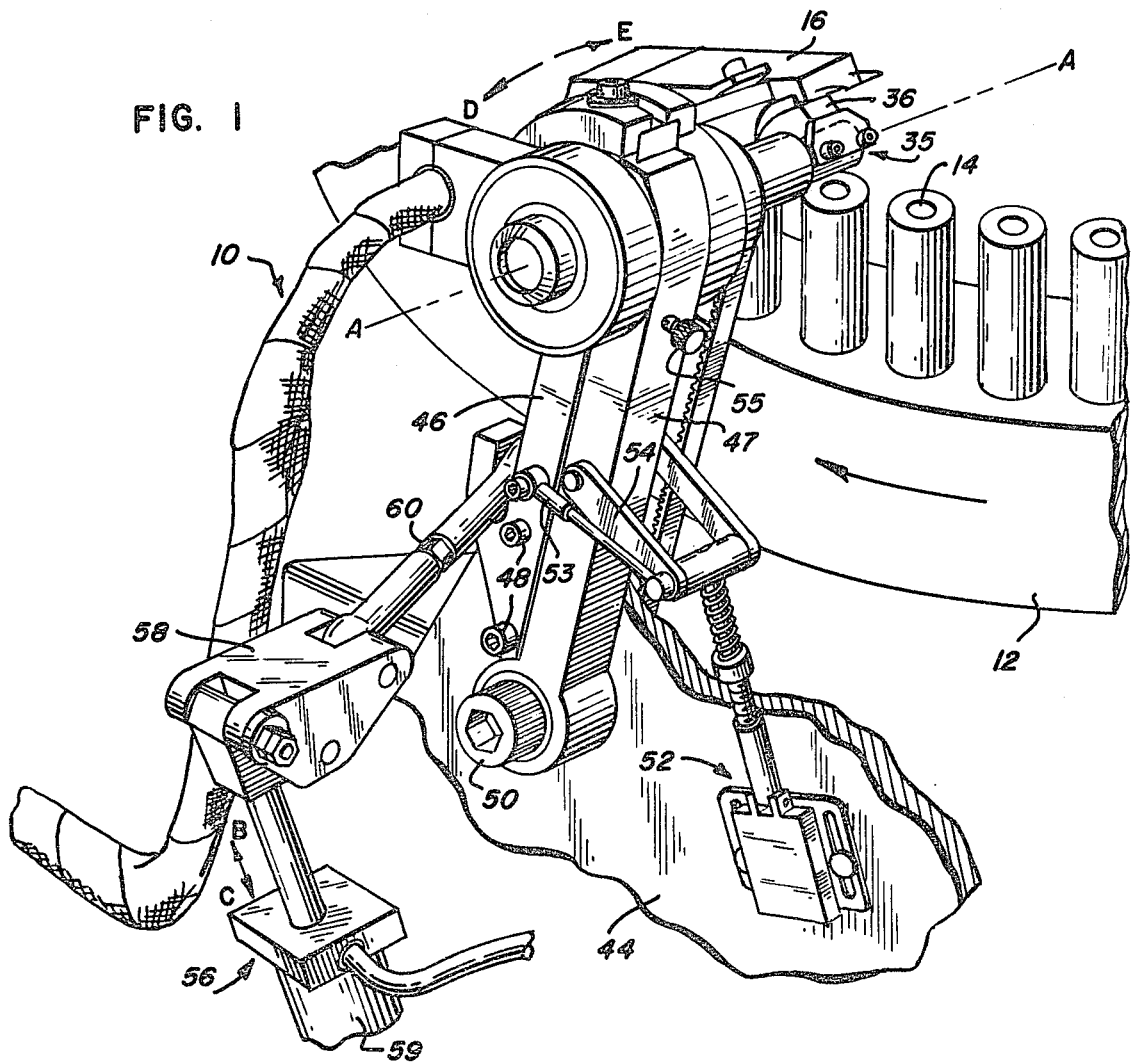
FIG. 1
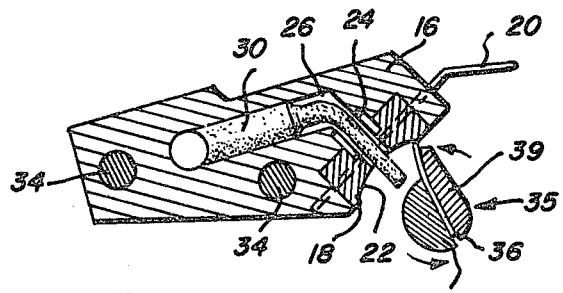
FIG. 2
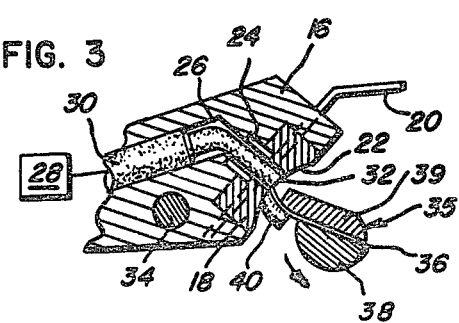
FIG. 3
FIG. 4

METHOD OF DISPENSING METERED CHARGES OF MATERIAL

This is a continuation of application Ser. No. 856,138, filed Nov. 30, 1977 now abandoned, which is a division of application Ser. No. 719,836, filed Sept. 2, 1976, now U.S. Pat. No. 4,080,136.

BACKGROUND OF THE INVENTION

This invention relates to an improved processing method in which a measured amount of extrudate is severed by a cutting means and deposited in a receptacle traveling on a conveyor. The method of this invention is performed with an apparatus which is adaptable to crown making machinery, wherein a plurality of uniformly spaced crowns are positioned on a conveyor and a measured amount of molten extrudate is deposited in each crown to be formed into an insert liner and to molding equipment including a plurality of dies wherein the molten extrudate is formed into a prescribed configuration.

Heretofore, the quantity of extrudate material deposited in each crown was metered by controlling the rate of extrusion of the extrudate material and then directing this material through a cutting means timed to the feed rate of the crowns past the depositing station. In the case of molding equipment, a similar method was followed. The cutting means severs a metered charge from the extrudate material and propels the metered charge toward the depositing station at a velocity about equal to the tangential velocity of the cutting blade. In these prior art systems the cutting means comprises one or more cutting blades which continuously rotate at a constant tangential velocity, and the speed of the conveyor, feed rate of the extrudate material, cutting velocity of the cutting blade and velocity imparted to the metered charge are all proportional at a given rate of production. Thus, the lower feed rate of the crowns, the lower the cutting velocity of the cutting blade. For any rate of production, several variables must be interrelated, and the feed rate of the crowns must therefore be compatible with the cutting rate of the cutting means which must be compatible with the minimum cooling time of the formed liner.

An illustrative prior art apparatus is U.S. Pat. No. 3,827,843 to Blouch, wherein the cutting means has a knife blade which is rotated in synchronism with a conveyor such as a rotating conveyor. The motor which rotates the conveyor also rotates the knife blade on the cutting means via a belt drive and a chain drive which are selected to rotate the knife in timed relation to the conveyor. The knife blade moves continuously at a constant tangential velocity.

The prior art systems work well at high feed rates, such as above about 400 crowns per minute, where the cutting blade has a cutting velocity corresponding to 400 revolutions per minute of the cutting blade.

At lower feed rates, however, such as below about 400 crowns per minute, depending on the extrudate material being severed, the metered quantities of extrudate material are frequently not centered on the crown after being severed by the cutting means, and defective inserts result. That the metered quantities of extrudate material are centered on the crowns when the apparatus is operating at high production rates but are not centered at low production rates seems to indicate that the extrudate material absorbs the shock of the cutting means and elongates rather than being sheared at the cutting velocity of the cutting means for production rates below about 400 crowns per minute. These machines work most effectively only when the production rate is sufficiently high that the cutting means will have the minimum cutting velocity required to cleanly sever and propel the extrudate material toward the crowns without having the extrudate material absorb some of the shock and elongating, thereby affecting, among other things, the trajectory of the extrudate material as it drops downwardly to the crowns.

Each material fed through the extruder has a unique critical deformation rate below which it begins to elongate rather than being cleanly sheared, and this is an additional variable.

SUMMARY OF THE INVENTION

The present invention obviates the disadvantages of the prior art by providing a method which is performed by an apparatus including a material receiving means such as a conveyor or carrousel carrying a plurality of constantly moving uniformly spaced receiving means, such as, receptacles, or dies, or other mechanisms in which the extrudate can be acted on an extruder for feeding extrudate material which exits through an outlet, a cutting surface positioned adjacent to the outlet, and a continuously rotating flexible and resilient cutting blade. The cutting blade rotates about an axis of rotation, and the distance between the distal end of the cutting blade and the axis of rotation is greater than the distance between the cutting surface and the axis of rotation. The rotating cutting blade thereby contacts the cutting surface during each revolution and bends from a rest condition to a backwardly bent flexed condition in which the cutting blade severs a metered charge from the material with a wiping action. The cutting blade is released from the cutting surface after severing the metered charge and snaps forwardly to thereby accelerate and propel the metered charge toward the receiving means at a velocity greater than the average tangential velocity per revolution of the cutting blade, and then assumes the rest condition after dampening.

There are two components to the velocity imparted to the metered charges. In addition to the average tangential velocity per revolution of the cutting blade, the flexing of the cutting blade adds to the velocity imparted to the metered charges, and the degree of flexing can be adjusted as desired. Although the average tangential velocity per revolution of the cutting blade is proportional to the feed rate of the receiving means, such as, receptacles and the speed of the conveyor, or in the case of a molding apparatus employing dies, the speed of the carrousel, or the like, containing the dies, the velocity imparted to the metered charges is not directly proportional to the feed rate because of the additional component of velocity resulting from the flexing of the cutting blade. The apparatus of the present invention will, therefore, supply a metered quantity of extrudate material to each receiving means, such as, receptacles, or dies, as the case may be, at a broader range of feed rates than was possible with prior art apparatuses. Due to the snap action of the flexible and resilient cutting blade, the velocity imparted to the metered charge is greater than with a rigid cutting blade which continuously rotates at a constant tangential velocity. The greater velocity facilitates in more accurately depositing the metered charge in a predetermined position in each successive receptacle, or die, and also enables the apparatus to work effectively at lower production rates, such as, about 60–400 units per minute, such that the extrudate material is cleanly severed and does not stick to the cutting blade. The snap action of the cutting blade minimizes the build-up of extrudate material on the cutting blade.

According to further features of the invention, the cutting blade is self-aligning against the cutting surface to minimize the possibility of the formation of an undesired web of extrudate material which can deflect the metered charge. The pressure between the cutting blade and the cutting surface causes the cutting blade to align with the cutting surface and cleanly sever a metered charge of extrudate material. In addition, the interference between the cutting blade and the cutting surface can be adjusted both vertically and horizontally while the apparatus is running; and the trajectory imparted to the metered charge can be adjusted inwardly and outwardly, and in the direction of rotation of the conveyor, or carrousel, or the opposite direction while the machine is running.

The method of the present invention for providing a metered charge of material to a receiving means includes the steps of extruding material through a feed orifice, and periodically contacting the extruded material with a rotating cutting means having a substantially uniform rate of rotation and a substantially radially extending flexible and resilient cutting blade having an axis of rotation. The cutting means severs a portion of the material and imparts a velocity to the severed portion which is greater than the average tangential velocity per revolution of the distal end of the cutting blade to direct the severed portion to the receiving means.

BRIEF DESCRIPTION OF THE DRAWINGS

FIG. 1 is a fragmentary perspective view of an apparatus utilizing the principles of the present invention;

FIG. 2 is a fragmentary cross-sectional view of a portion of the apparatus of FIG. 1 in a position wherein the cutting blade has contacted the cutting surface.

FIG. 3 is a fragmentary cross-sectional view similar to FIG. 2 and showing the cutting blade after severing a metered charge of material;

FIG. 4 is a fragmentary cross-sectional view similar to FIGS. 2 and 3 and showing the cutting blade in a rest condition after being released from the cutting surface.

DESCRIPTION OF THE PREFERRED EMBODIMENT

Figure 5:
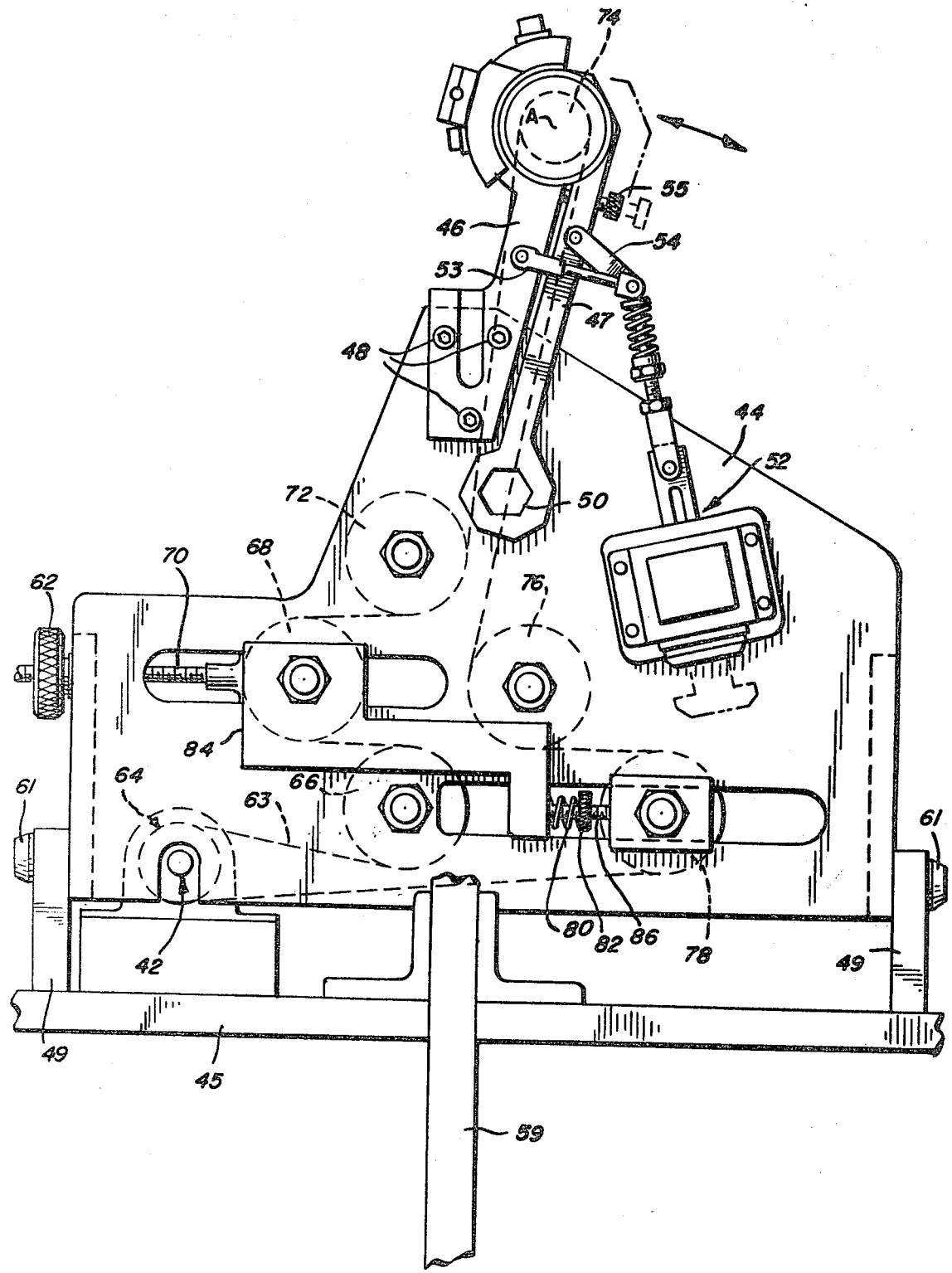
FIG. 5 is an enlarged front elevational view of the apparatus of FIG. 1.

The apparatus 10 utilizing the principles of the present invention is illustrated in FIG. 1 and includes a receiving means such as a carrousel 12 supported for rotation about a fixed vertical axis (not shown) and which supports a plurality of open-topped cavity forming mold members or dies 14 and moves the dies along a receiving path at a predetermined feed rate. While the illustration and description will be directed to mold forming apparatus and method, the novel cutting means and method can obviously be applied to a variety of other devices that will use a measured quantity of extrudate material, such as, for example, a receptacle such as a crown shell.

The apparatus includes cutting surface means comprising a nozzle block 16 and a cutting block 18 which is receivable in the nozzle block 16 and is retained therein by means of a generally U-shaped wire clip 20. The cutting block 18 has an arcuate cutting surface 22 which faces outwardly from nozzle block 16. Nozzle block 16 may be formed of aluminum, steel or other suitable materials, and cutting block 18 is preferably formed of glass-filled Teflon.

Bushing 24 is provided to align nozzle block 16 and cutting block 18, and a passage 26 is provided through the nozzle block 16, bushing 24 and cutting block 18. A conventional extruder 28 (FIG. 3) produces a continuous supply of extrudate material 30 which is directed through passage 26. The extrudate material 30 exits the passage 26 through a feed orifice or outlet 32 in cutting block 18. Outlet 32 is preferably positioned above the receiving path for the dies 14 so that the extrudate material can be directed along a generally vertical path toward the receiving path defined by carrousel 12. Though a generally vertical path is preferred, the present invention can also be employed to direct the extrudate material along a path which is at an angle to the vertical. Extruder 28 progressively feeds the extrudate material 30 at a rate proportional to the feed rate, to enable the same measured amount of material to be supplied to each die. Electric heaters 34 are provided and have a temperature which is controlled by thermocouples (not shown) to control the temperature of the nozzle block 16 to regulate the temperature of the extrudate material to maintain the extrudate material at the optimum temperature.

As shown in FIG. 2, rotating cutting means 35 has a cutting blade 36 which is supported for rotation between blade holder 38 and radius block 39. Cutting blade 36 is rotated about horizontal axis A—A (FIG. 1), which is the center line of arcuate cutting surface 22 and is therefore generally parallel to arcuate cutting surface 22, at a substantially uniform rate of rotation for severing extrudate material 30 into metered charges 40 (FIGS. 3 and 4). Carrousel 14, and cutting means 35 are both driven by driving means 42 (FIG. 5).

Cutting blade 36 is flexible and resilient and is formed of a suitable material such as stainless steel. As illustrated in FIG. 4, the distance between the distal end 43 of cutting blade 36 and the axis of rotation A—A is greater than the distance between the axis of rotation A—A and cutting surface 22 on cutting block 18. The rotating cutting blade 36 thereby starts from a rest condition in which the cutting blade is generally straight, and bends to a backwardly bent flexed condition (FIG. 2) when the cutting blade 36 contacts cutting surface 22. Cutting blade 36 moves along cutting surface 22 with a wiping action and severs a slug or metered charge 40 of extrudate material as shown in FIG. 3. The cutting blade 36 remains in a flexed condition until it is released from cutting surface 22 after severing a metered charge 40, whereupon cutting blade 36 snaps forwardly to thereby accelerate and propel the metered charge 40 toward the receiving means, and then assumes the rest position (FIG. 4) after dampening.

The snapping action of cutting blade 36 propels the metered charge 40 at a velocity greater than the average tangential velocity per revolution of the cutting blade 36. Each time cutting blade 36 contacts cutting surface 22 and moves along the cutting surface with a wiping action, a metered charge 40 is severed from the extrudate material 30 and is deposited into the open-topped die 14 by the combination of forces imparted to it by cutting blade 36 and gravity. Cutting blade 36 rotates continuously, and operates at a rate proportional to the feed rate of the dies and the feed rate of extrudate material 30 so that a measured amount of material is supplied to each die.

To facilitate in enabling cutting blade 36 to bend backwardly into the flexed condition upon contacting cutting surface 22, the end of radius block 39 which faces the end of the cutting blade 36 between horizontal axis A—A and distal end 43, is preferably curved as shown in FIG. 4. The curve in radius block 39 permits the entire portion of cutting blade 36 which extends outwardly from blade holder 38 to bend backwardly while limiting the extent to which a portion of the cutting blade can bend.

It is a feature of the present invention that cutting blade 36 is self-aligning against cutting surface 22. With prior art rigid cutting blades, any misalignment between the cutting blade and the cutting surface creates a gap which results in the formation of a thin thread or web or plastic material when the cutting blade passes through the extrudate material to form a metered charge. The web can deflect the metered charge along its path to the dies 14 and has the disadvantage that the metered charge might not land within the die 14, as desired. With the present invention, however, the pressure between cutting blade 36 and cutting surface 22 causes the distal end 43 of cutting blade 36 to align with and conform to the cutting surface 22 even when the alignment of the cutting blade and cutting surface is slightly off. There is no clearance between the cutting blade and cutting surface even when there is a slight misalignment. A metered charge 40 is thereby completely severed from the extrudate material 30 without resulting in an undesirable web or strand of uncut plastic material. Thus, greater tolerances are permissible than with prior art apparatuses.

According to a further feature of the present invention, the snap action of the cutting blade which propels the metered charge at a velocity greater than the average tangential velocity per revolution of the cutting blade minimizes the build-up of extrudate material on the cutting blade. Continuously rotating cutting blades as disclosed in the prior art have a constant tangential velocity and there is a tendency for some of the material in the metered charges to stick to the cutting blade, and build up over a period of time. Unlike the prior art, the distal end 43 of cutting blade 36 of the present invention quickly accelerates upon being released from cutting surface 22 and then quickly decelerates to assume the rest condition which is maintained until the cutting blade again contacts the cutting surface. The sudden acceleration and deceleration of distal end 43 of cutting blade 36 helps to prevent the metered charge from sticking to the cutting blade which would result in a build-up of extrudate material on the cutting blade.

The snap action of the distal end 43 of cutting blade 36 propels the metered charges 40 toward the dies 14 at a velocity greater than the average tangential velocity per revolution of the cutting blade. Prior art apparatuses having a continuously rotating cutting blade can cleanly sever a metered charge of material only at high production rates, with the cutting blade severing at least 400 metered charges per minute, depending on the type of extrudate material. By enabling the cutting blade to propel the metered charges 40 at a velocity significantly greater than the average tangential velocity of the cutting blade, a wider range of products can be produced with the apparatus of this invention. For example, the apparatus has been successfully used at production rates as low as 60 parts per minute.

The snap action of the distal end 43 of cutting blade 36 enables the cutting blade to impart a much higher velocity to the metered charges 40 than is possible with a relatively rigid prior art cutting blade which continuously rotates at the equivalent r.p.m. The significantly higher velocity imparted to the metered charges also results in greater accuracy in directing the metered charges into the dies 14 on the carrousel 12.

Referring to FIGS. 1 and 5, apparatus 10 includes a frame 44 which is connected to machine base 45 by means of brackets 49. A pair of legs 46, 47 are mounted to the frame. One end of left leg 46 is fixed to frame 44 by means of bolts 48 and the other end of the left leg is connected to nozzle block 16. One end of right leg 47 is pivotably mounted to frame 44 and can be rotated about an eccentric, off-center bushing which can be turned by hexagonal head 50, and the other end of the right leg is connected to cutting means 35. Solenoid 52 has arms 53, 54 connected to legs 46, 47 respectively. Solenoid 52 is used to shift the cutting means relative to the nozzle block and cutting surface in a generally horizontal direction perpendicular to axis A—A. As shown in phantom in FIG. 5, cutting means 35 is retracted away from nozzle block 16 and cutting surface 22 when the solenoid is de-energized to provide clearance for a hot strand of extrudate material when apparatus 10 is not running and to allow for start-up of extruder 28.

To shift the cutting means relative to the conveyor, an air cylinder and piston rod assembly 56 is provided and has one end (not shown) connected to the lower end of fixed support 59 and an opposite end connected to bell crank 58 which is pivotally connected to the upper end of fixed support 59. Turnbuckle assembly 60 is a link having one end connected to bell crank 58 and an opposite end connected to fixed left leg 46. The piston can be extended or retracted in the direction of arrows B and C, respectively, to pivot frame 44 about shoulder bolts 61 which extend through brackets 49. Thus, extension or retraction of the piston rod moves the cutting means 35, fixed leg 46 and frame 44 relative to the carrousel. More specifically, when the piston rod is retracted, the bell crank 58 rotates counterclockwise and cutting means 35 is moved away from carrousel 12 in the direction of arrow D which is generally parallel to axis A—A. Cutting means 35 can be driven while in the retracted position to enable apparatus 10 to achieve full speed before metered charges 40 are severed and fed to the dies 14. Also, metered charges can be collected, such as for measurements of size and weight, before they are fed to the dies.

It is a feature of this invention that the interference between cutting blade 36 and the cutting surface 22 of cutting block 18 can be adjusted both vertically and horizontally while apparatus 10 is running. A screw 55 is positioned in a threaded opening in right leg 47 and abuts against left leg 46. By tightening or loosening screw 55, the distance between legs 46, 47 in a generally horizontal plane is increased or decreased to vary the interference between cutting blade 36 and cutting block 18. A generally vertical component to the adjustment of the interference between the cutting blade and cutting block can be accomplished by turning the eccentric bushing 50 to raise or lower right leg 47 and cutting means 35 while apparatus 10 is running.

In addition, the trajectory imparted to the metered charges 40 can be adjusted while the machine is running. Operation of the turnbuckle 60 rotates nozzle block 16 in the direction of arrows D and E, as desired, to alter the trajectory of metered charges 40 in a direction perpendicular to the rotation of carrousel 12 either inwardly, toward the center of carrousel 12, or outwardly, away from the center of carrousel 12. The trajectory of the metered charges 40 can also be adjusted fore and aft while the machine is running, i.e., either in the direction of rotation of carrousel 12, or in the opposite direction, by operating knob 62 (FIG. 5). This changes the timing of the metered charges relative to the dies 14, as described hereinbelow, to facilitate in synchronizing the metered charges and the dies to prevent the metered charges from hitting the dies either too soon or too late so that the metered charges will be accurately received in the dies each time a die is in a predetermined position. It is a particular feature to make these adjustments while apparatus 10 is running.

Cutting means 35 is driven by endless toothed belt 63 (FIG. 5) which is powered by drive pulley 64. Drive pulley 64 is connected to driving means 42. Belt 63 travels about first idler pulley 66 to second idler pulley 68 which is supported on a threaded shaft 70. Belt 63 travels from second idler pulley 68 to third idler pulley 72, to cutter shaft pulley 74 which is driven by belt 63 and rotates the cutting blade, to fourth and fifth idler pulleys 76 and 78, and back to drive pulley 64. The tension in belt 63 can be adjusted by means of knob 82 which alters the length of spring 80. Knob 62 is mounted on rod 70, and rotation of the knob in a clockwise or counterclockwise direction causes the second idler pulley 68, link 84, spring 80, knob 82, threaded rod 86, and fifth idler pulley 78 to shift to the left, or right, as a unit. By rotating knob 62 and moving second idler pulley 68 and fifth idler pulley 78 to the left or right, cutter shaft pulley 74 is retarded or advanced in relation to drive pulley 64 to enable cutting blade 36 to sever a metered charge 40 relatively earlier or relatively later to adjust the timing of the metered charges 40 and dies 14 while apparatus 10 is running. The driving orientation between the cutting means and the conveyor can thereby be changed.

The Teflon cutting block prevents sticking of extrudate material to the cutting block especially during startup. Additionally, if the cutting block becomes worn or damaged, it can be quickly changed without the use of tools by removing the clip 20 and installing a new cutting block.

The method of the present invention for providing a metered charge of material to a receiving means includes the steps of extruding material through a feed orifice and periodically contacting the extruded material with a rotating cutting means having a substantially uniform rate of rotation and a substantially radially extending flexible and resilient cutting blade having an axis of rotation. The cutting means severs a portion of the material and imparts a velocity to the severed portion which is greater than the average tangential velocity per revolution of the distal end of the cutting blade to direct the severed portion to the receiving means.

The method may include the further steps of bending the cutting blade backwardly from a rest condition to a flexed condition before contacting the material, and snapping the cutting blade forwardly from the flexed condition to the rest condition after severing the extruded portion of the material, thereby accelerating and propelling the severed portion toward the receiving means.

While this invention is susceptible of embodiment in many different forms, there is shown in the drawings and has been described herein in detail a specific embodiment of the invention, with the understanding that the present disclosure is to be considered as an exemplification of the principles of the invention and is not intended to limit the invention to the embodiment illustrated.

I claim:

1. A method of providing a metered charge of material to a receiving means each time the receiving means, which moves at a predetermined rate within a range of operable rates, is in a predetermined position, which comprises: extruding material through a feed orifice; rotating cutting means having a substantial flexible and resilient cutting blade with a distal end which is operably positioned with respect to said feed orifice so that said distal end travels at an average tangential velocity; severing the extruding portion of said extruded material by periodically contacting the extruded material with said cutting means; bending said cutting blade backwardly by providing a surface which said cutting blade contacts; and releasing said cutting blade from said surface so that said cutting blade snaps forwardly to impart a velocity to the severed portion which is greater than the average tangential velocity of the distal end of said cutting blade to direct to said severed portion to said receiving means.

2. A method as defined in claim 1 including the steps of: bending said cutting blade backwardly from a straight and unflexed condition to a flexed and bent condition before contacting said material; and snapping said cutting blade forwardly from said flexed condition to said unflexed condition after severing the extruded portion of said material, thereby accelerating and propelling said severed portion toward said receiving means at said velocity.

3. A method as defined in claim 2 including the steps of providing an arcuate cutting surface adjacent to said feed orifice and facing said cutting means, said cutting means rotating at a substantially uniform rate of rotation about an axis of rotation which is generally parallel to said cutting surface, the distance between the distal end of said cutting blade and the axis of rotation being greater than the distance between the axis of rotation and said cutting surface, whereby said rotating cutting blade contacts said cutting surface and bends backwardly and then said cutting blade snaps forwardly when released from said cutting surface.

* * * * *